US008814985B2

(12) United States Patent
Gerds et al.

(10) Patent No.: US 8,814,985 B2
(45) Date of Patent: Aug. 26, 2014

(54) COMPOSITE ADSORBENT BEAD, PROCESS FOR ITS PRODUCTION, GAS SEPARATION PROCESS AND GAS ADSORPTION BED

(75) Inventors: Almuth Gerds, Dresden (DE); Norman Reger-Wagner, Dresden (DE); Wolfgang Hungerbach, Mullheim (DE); Constant Johan Van Lookeren, Bilthoven (NL); Roger Whitley, Allentown, PA (US); Jeffrey Raymond Hufton, Fogelsville, PA (US); Timothy Christopher Golden, Allentown, PA (US)

(73) Assignees: Glatt Systemtechnik GmbH, Dresden (DE); Air Products and Chemicals, Inc., Allentown, PA (US)

( * ) Notice: Subject to any disclaimer, the term of this patent is extended or adjusted under 35 U.S.C. 154(b) by 466 days.

(21) Appl. No.: 13/140,510

(22) PCT Filed: Dec. 22, 2009

(86) PCT No.: PCT/EP2009/009227
§ 371 (c)(1),
(2), (4) Date: Mar. 8, 2012

(87) PCT Pub. No.: WO2010/072404
PCT Pub. Date: Jul. 1, 2010

(65) Prior Publication Data
US 2012/0152115 A1 Jun. 21, 2012

(30) Foreign Application Priority Data
Dec. 22, 2008 (EP) .................... 08022287

(51) Int. Cl.
*B01D 53/04* (2006.01)
*B01J 20/32* (2006.01)
*B01J 20/28* (2006.01)
*B01J 20/30* (2006.01)
*B01J 20/12* (2006.01)
*B01D 53/02* (2006.01)
*B01J 20/18* (2006.01)
*B01D 53/047* (2006.01)

(52) U.S. Cl.
CPC ............ *B01J 20/12* (2013.01); *B01J 20/28014* (2013.01); *B01J 20/3092* (2013.01); *B01J 20/28011* (2013.01); *B01J 20/3293* (2013.01); *B01J 20/3204* (2013.01); *B01J 20/3042* (2013.01); *B01D 2253/302* (2013.01); *B01J 20/28057* (2013.01); *B01J 20/28019* (2013.01); *B01D 53/0462* (2013.01); *B01D 2253/108* (2013.01); *B01D 2256/16* (2013.01); *B01J 20/3238* (2013.01); *B01D 53/047* (2013.01); *B01D 2253/11* (2013.01); *B01J 20/2803* (2013.01); *B01D 53/02* (2013.01); *B01J 20/28004* (2013.01); *B01J 20/3028* (2013.01);
*B01J 20/18* (2013.01); *B01J 2220/56* (2013.01); *B01J 2220/58* (2013.01)
USPC ............... 95/90; 96/154; 502/84; 502/439; 428/403

(58) Field of Classification Search
USPC ........... 95/90, 900; 96/131, 132, 154; 502/60, 502/68, 80, 84, 400, 439; 428/403; 264/109, 117
See application file for complete search history.

(56) References Cited

U.S. PATENT DOCUMENTS

| 3,340,085 | A | * | 9/1967 | Halasz et al. .................. 502/400 |
| 4,046,529 | A | * | 9/1977 | Fletcher et al. ................ 96/127 |
| 4,222,981 | A | * | 9/1980 | Caswell ....................... 264/117 |
| 4,283,583 | A | * | 8/1981 | Velenyi et al. ................ 585/467 |
| 4,420,419 | A | * | 12/1983 | Ogawa et al. .................. 502/68 |
| 4,894,285 | A | * | 1/1990 | Fitzgibbob ................... 428/402 |
| 4,964,888 | A | | 10/1990 | Miller |
| 5,707,516 | A | | 1/1998 | Tomizawa et al. |
| 6,890,373 | B2 | * | 5/2005 | Nemoto et al. .................. 95/90 |
| 2004/0228978 | A1 | | 11/2004 | Jacob et al. |
| 2005/0005869 | A1 | | 1/2005 | Fritter et al. |
| 2005/0072305 | A1 | | 4/2005 | Van Lookeren et al. |
| 2007/0023187 | A1 | * | 2/2007 | Canova et al. ............. 166/280.2 |
| 2008/0161181 | A1 | * | 7/2008 | Schmidt et al. ................ 502/73 |

FOREIGN PATENT DOCUMENTS

| EP | 1080771 A1 | 3/2001 |
| EP | 1552752 A2 | 7/2005 |
| FR | 2794993 A | 12/2000 |
| WO | WO 99/28013 A2 | 6/1999 |
| WO | WO 01/34295 A1 | 5/2001 |
| WO | WO 2004/101132 A1 | 11/2004 |

OTHER PUBLICATIONS

Machine generated English translation of FR 2794993 A1, published Dec. 2000.*
European Patent Office, Examination Report in European Application No. 08 022 287.0 (Jul. 19, 2013).
European Patent Office, International Preliminary Report on Patentability in International Application No. PCT/EP2009/009227 (Jul. 7, 2011).
State Intellectual Property Office of the People'S Republic of China, Office Action in parallel Chinese Application No. 200980157289.5 (Apr. 19, 2013).
Sommer, K., "Size Enlargement: Processes and Process Engineering", *Ullmann's Encyclopedia of Industrial Chemistry*, Wiley-VCH Verlag GmbH & Co., pp. 1-39 (2000).

(Continued)

*Primary Examiner* — Frank Lawrence
(74) *Attorney, Agent, or Firm* — Leydig, Voit & Mayer, Ltd.

(57) ABSTRACT

Composite adsorbent beads have a porous and non-adsorbent core comprising at least one inorganic material and a porous and adsorbent shell comprising at least one adsorbent layer comprising a porous adsorbent material on the surface of the core. The core preferably comprises agglomerated inorganic particles having a mean particle size equal to or smaller than the mean particle size of the surrounding agglomerated adsorbent particles. The beads preferably are manufactured by calcining together a non-sintered core and the adsorbent layer. The beads can be used at the outlet end of an adsorption column to improve performance.

20 Claims, 5 Drawing Sheets

(56) References Cited

OTHER PUBLICATIONS

European Patent Office, Extended Search Report in European Application No. 08022287.0 (Oct. 6, 2009).

European Patent Office, International Search Report in International Application No. PCT/EP2009/009227 (Jul. 13, 2010).
Australian Patent Office, Patent Examination Report No. 1 in Australian Patent Application No. 2009331920 (May 19, 2014).

\* cited by examiner

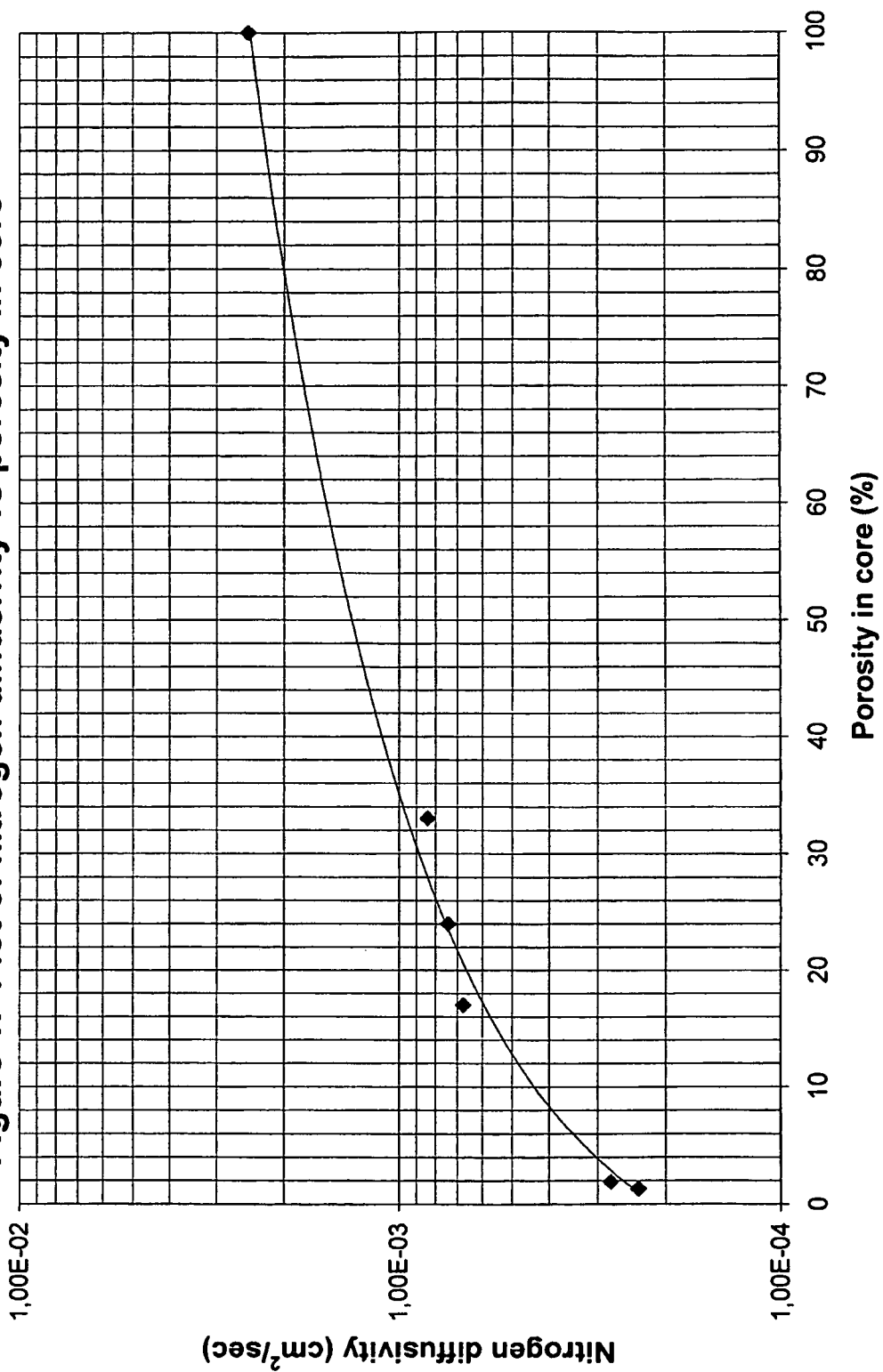

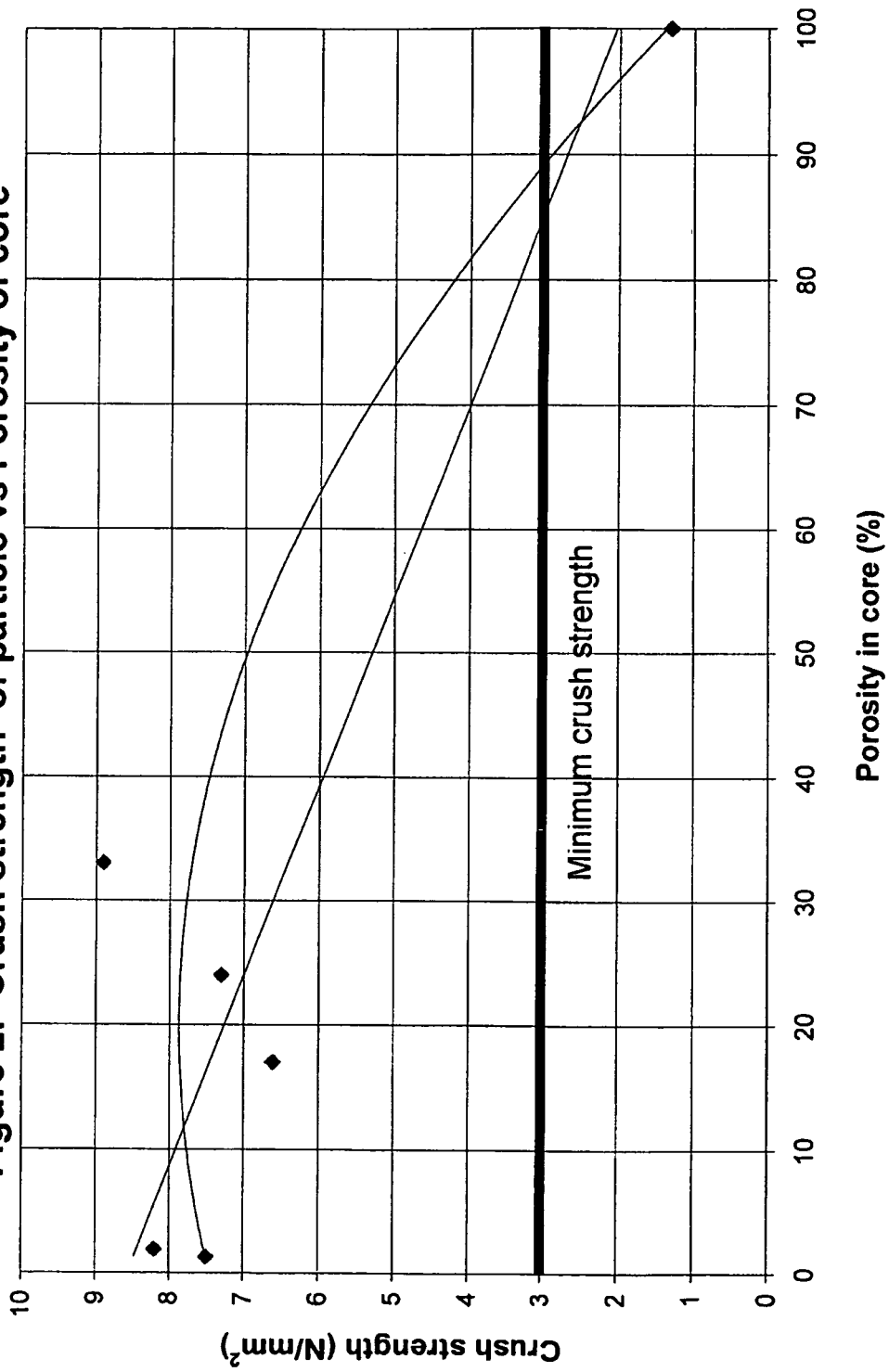

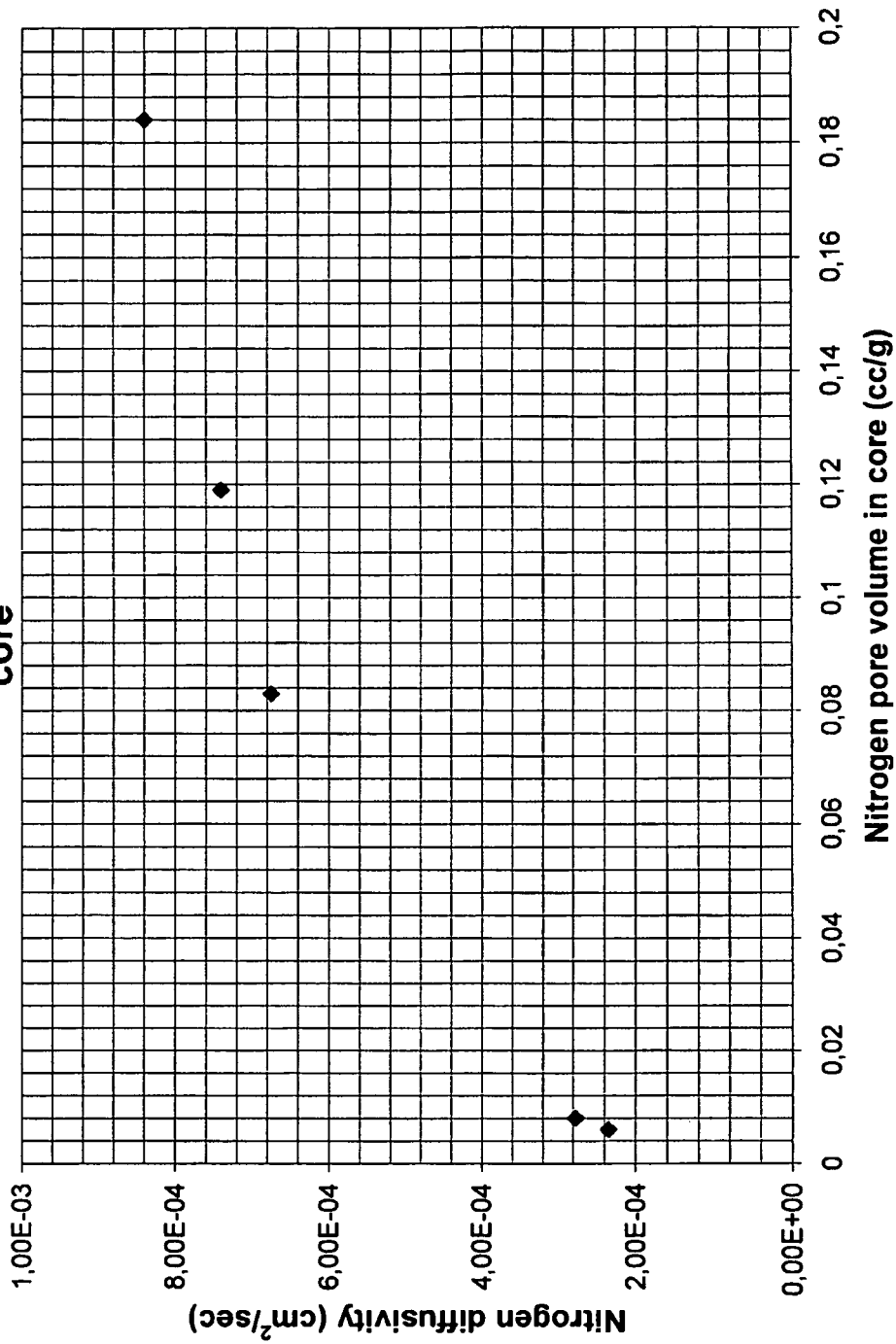

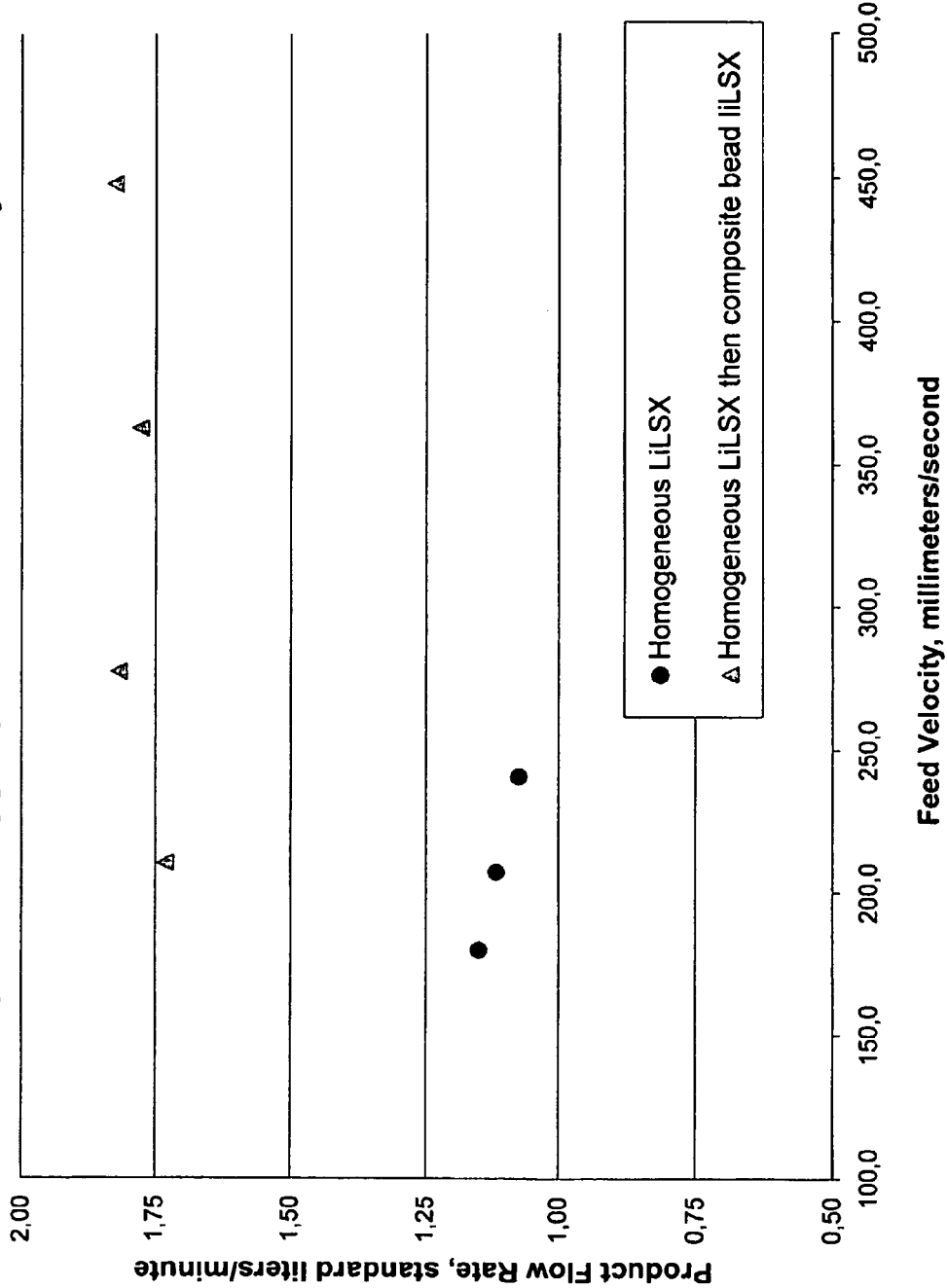

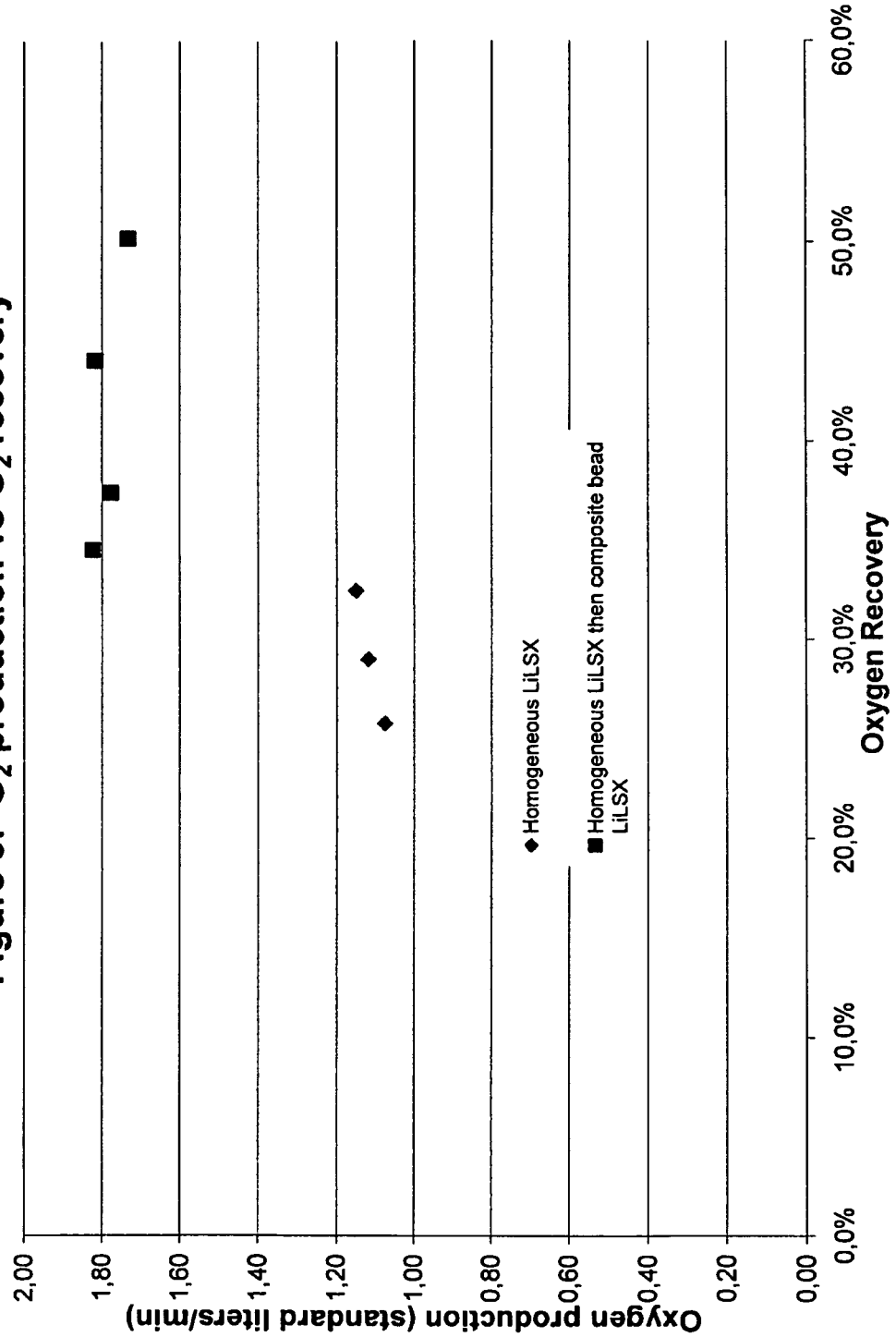

US 8,814,985 B2

COMPOSITE ADSORBENT BEAD, PROCESS FOR ITS PRODUCTION, GAS SEPARATION PROCESS AND GAS ADSORPTION BED

CROSS-REFERENCE TO RELATED APPLICATIONS

The present application is the U.S. National Phase Application of PCT/EP2009/009227, filed Dec. 22, 2009, which claims the benefit of European Patent Application No. 08022287.0, filed Dec. 22, 2008, the disclosures of which are incorporated by reference.

The present invention relates to composite adsorbent beads for the separation of at least one gas component from a gas mixture and has particular, but not exclusive, application to gas purification processes using PSA and/or TSA techniques. In particular, the invention provides improved composite adsorbent beads, a process for the manufacturing of composite adsorbent beads, and a gas separation process and an adsorbent bed using composite adsorbent beads.

The application of adsorbents for gas separation and purification is of increasing importance for many chemical processes. In an adsorption gas separation process, a gas mixture is brought into contact with an adsorbent. One gas component is preferentially adsorbed thereby producing a gas phase enriched in the less strongly adsorbed component. When the adsorbent is saturated, the pressure is reduced and/or the temperature is increased, such that the preferentially adsorbed gas component is released producing a desorbed gas stream enriched in the preferentially adsorbed component.

The separation process can be improved by increasing the mass transfer rate and/or the adsorption capacity of the adsorbent particles. Other important factors determining the performance of the gas separation process are the physical strength and the density of the adsorbent particles. If the adsorbent particles do not have sufficient mechanical strength, they can break apart during adsorption processing where the particles are exposed to high gas velocities, pressure changes and temperature changes. In addition, if the adsorbent density is too low for the specific gas velocity and particle diameter of the adsorption process, the adsorbent material may fluidise and leave the separation process with the gas flow. Therefore, useful adsorbent materials have to show good mass transfer characteristics while retaining good mechanical (crush) strength to prevent them crumbling and creating increased pressure drop. Further, they should be resistant to fluidization, which is aided by high bulk density (weight of adsorbent/unit volume of adsorption vessel) of the material.

For such processes, composite adsorbent beads are known from FR-A-2794993. The disadvantage of these composite adsorbent beads is that they comprise sintered clay particles of 100 μm, since they are produced with a rotating pan agglomerator starting with sintered clay particles obtained by shattering and sieving large lumps of sintered clay over a sieve separating out particles larger than 0.1 mm. Consequently the non-adsorbent cores have a low sphericity, a low surface area and/or a high particle size distribution ratio $D_{90}/D_{50}$, in particular if the mean particle size of the composite adsorbent beads is small, for instance several hundred microns or smaller. Nothing is mentioned in relation to crush strength, surface area or particle size distribution of the cores of the composite adsorbent beads.

EP-A-1 080 771 describes a gas separation process using composite adsorbent particles with an inner core comprising a non-porous and non-adsorbent material, e.g. sintered clays, such as kaolin, or alumina and at least one outer layer comprising an adsorbent material. All the cores of the non-porous and non-adsorbent material are impermeable. Those composite beads can be used to improve the mass transfer in adsorption processes without reducing the particle size of the beads. Composite beads with a non-porous core have a lower active adsorbent content in comparison to homogeneous adsorbent beads because they have an inactive core and typically contain at least as much inactive inorganic binder material in the shell as well known commercial homogeneous adsorbent beads. However the disadvantage of the lower adsorption capacity is offset by the improved mass transfer rate. The improved mass transfer rate is a result of reducing the gas diffusion length in the particle, i.e. the diffusion length through the shell of the adsorbent beads (active adsorbent) is less than the diffusion length in a homogeneous bead (which is the particle radius).

Composite beads with non-porous cores suffer from the problem that the outer layer tends to crack during the sintering and activation process at the high temperatures of between 200° C.-600° C. applied. It is believed that this is due to the fact that the cores of non-porous material, e.g. of quartz sand, foamed glass or pre-sintered inorganic agglomerates, have a different thermal expansion coefficient than the outer porous adsorbent layer.

The crush strength of the active adsorbent material can be improved by adding inorganic binder material; however this will further reduce the adsorption capacity and consequently the performance of the composite adsorbent particle. For composite adsorbent beads, which already have a low adsorption capacity due to their inactive core, it is desirable to use little inorganic binder to retain as high an adsorption capacity as possible.

Nothing is mentioned in relation to both the sphericity and the particle size distribution of the composite adsorbent in EP-A-1 080 771.

Another problem of composite beads having solid impermeable non-porous cores relates to the difficulty of producing them in a small size. Composite beads with an average particle diameter of 1 mm or smaller are very difficult to produce due to the fact that solid cores with a size less than 0.7 mm and a narrow particle size distribution are not readily available.

The importance of mass transfer performance in adsorption processing is well known. In pressure swing adsorption gas separation processes smaller size adsorbent particles with a higher mass transfer performance can be placed at the outlet (product) end of the adsorption column, whereas larger adsorbent particles are placed at the feed end (see e.g. U.S. Pat. No. 4,964,888). The key drawback of this approach is that the small particles cause higher pressure drop in the column during operation. This higher pressure drop can both reduce performance of the adsorption process (higher pressure during regeneration hurts overall performance) and lead to fluidization of the smaller particles.

It was therefore an object of the present invention to overcome the disadvantages of the prior art and to provide a composite adsorbent bead with an increased mass transfer performance, increased bulk density relative to corresponding homogeneous adsorbents and/or having a sufficiently high specific (i.e. cross-sectional) crush strength as well as a lower tendency to crack during manufacturing or gas separation processing, which could be provided in a wide range of particle sizes.

This technical problem is solved by forming the composite adsorbent bead with a porous and non-adsorbent core.

The technical problem is solved by the described composite adsorbent bead, the process of producing composite adsorbent beads, the dried porous and non-adsorbent core, the gas separation process, the use of the composite adsorbent beads, and the adsorption vessel. The further preferred embodiments are also described.

According to a first aspect, the present invention provides a composite adsorbent bead for the separation of at least one gas component from a gas mixture, the adsorbent bead having at least one porous and non-adsorbent core comprising at least one inorganic material and a porous and adsorbent shell comprising at least one layer comprising a porous adsorbent material on the surface of the core.

In a preferred embodiment of this aspect, the core comprises agglomerated inorganic particles having a mean particle size equal to or smaller than the mean particle size of surrounding agglomerated adsorbent particles forming said layer.

According to a second aspect, the present invention provides a process for the production of a composite adsorbent bead of the first aspect comprising:
 a) producing a dried porous non-adsorbent core having a moisture content in the range of 0.1 wt % and 25 wt %, comprising an organic binder,
 b) applying a porous layer comprising adsorbent material, and
 c) at least one heating step, whereby the organic binder material is removed.

According to a third aspect, the present invention provides a dried porous and non-adsorbent core, suitable as an intermediate product for the production of a composite adsorbent bead by the process of the second aspect, said core comprising agglomerated clay particles with a particle size in the range of 0.05 µm to 5 µm, an organic binder, and a moisture content in the range of 0.1 wt % and 25 wt %

According to a fourth aspect, the present invention provides a gas separation process for the separation of at least one gas component from a gas mixture comprising feeding a gas mixture comprising at least two gas components into an adsorption vessel comprising a bed of the composite adsorbent beads of the first aspect and subjecting the gas mixture to conditions which allow the adsorption of at least one gas component which has to be separated from the gas mixture.

According to a fifth aspect, the present invention provides the use of composite adsorbent beads of the first aspect in a layered adsorption bed, preferably in Pressure Swing or Thermal Swing Adsorption processes and preferably as the layer at the outlet end of the bed According to a sixth aspect, the present invention provides an adsorption vessel having an adsorption bed comprising composite adsorbent beads of the first aspect.

According to a seventh aspect, the present invention provides a process of producing composite adsorbent beads comprising forming a non-sintered core comprising an inorganic material having hydroxyl groups and an organic binder; coating the core with a layer comprising an adsorbent material having hydroxyl groups, an organic binder and 2 to 20 wt % inorganic binder; and heating the coated core to remove the organic binder and calcine the core and layer together.

Unless otherwise apparent from the context, the terms "bead" and variations thereof are used synonymously with "particle" and variations thereof.

Porosity in the present invention is defined as the ratio (typically cited as a percentage) of the total void volume in the material to the total material volume (void volume/particle volume). Porosity can be determined by mercury intrusion porosity according to ASTM method D4284, this is sometimes referred to as the permeable porosity. The particle volume is defined as the volume enveloped by the particle. The void volume can be, and in the experimental data reported herein was, determined by nitrogen adsorption at 77 K ($cm^3$ void/g solid). The crystal densities of the materials can be, and in the experimental data reported herein, were, then obtained by water pycnometry (g solid/$cm^3$ solid). The particle density can then be calculated from the crystal density and the void volume. For example, if the crystal density of the core was 2.6 g solid/$cm^3$ solid and the pore volume was 0.1 $cm^3$ void/g solid, then 2.6 grams solid contained 0.26 $cm^3$ void. The particle or envelope density is then given by 2.6 g solid/(1 $cm^3$ crystal+0.26 $cm^3$ void)=2.06 g solid/$cm^3$ particle. The total porosity is then determined by multiplying the pore volume by the particle density ($cm^3$ void/g solid×g solid/$cm^3$ particle=$cm^3$ void/$cm^3$ particle).

The core material must be porous, preferably permeable, but non-adsorbing. Non-adsorbing in the present invention is defined relative to the shell material as having a nitrogen capacity at least 20 times lower than the shell material at 101 kPa pressure and 30° C.

The composite beads of the present invention are a solution to the above-mentioned problems of the prior art. The same size or even larger diameter beads at the outlet of the bed can be used with increased mass transfer properties (owing to the short diffusion length in the composite bead shell). If the same size beads are used, no pressure drop penalty is incurred during processing. If larger particles are used, then both faster mass transfer and lower pressure drop on the outlet of the bed is possible. Further, the composite beads have higher density than homogenous adsorbent particles. This higher density will allow higher gas velocities in the process before the onset of fluidization even if smaller adsorbent particles than the main homogeneous adsorbent are used. This means that the composite beads of the present invention can be used in layered beds (composite adsorbent at the bed outlet) to improve adsorption processes in either of two ways. First, the same size or even larger diameter composite beads than the main homogeneous adsorbent can be placed at the adsorber outlet to improve mass transfer and possibly lower bed pressure drop. The prior art techniques increase bed pressure drop while this solution keeps pressure drop unchanged or even reduces pressure drop. Second, the composite beads of the invention will not fluidize despite higher pressure drop owing to their increased density over that of the homogeneous adsorbent.

The composite adsorbent beads of the present invention can also be used as "active" bed hold-down material. In many gas phase adsorption processes, large diameter, dense beads are placed on the outlet (top) of the bed. The function of these dense beads is to ensure that smaller particle "active" adsorbent beneath them (closer to the feed end of the bed) do not fluidize or rotate when gas is flowing through the bed. Typically these hold-down beads are larger diameter than the active adsorbent below them and are non-porous to increase their density. Owing to their non-porous nature these current hold-down beads do not have adsorption capacity for impurity removal and hence are "inactive". The composite adsorbent beads of the present invention can act as both a physical hold-down (large diameter and higher density than active adsorbent below) and an active adsorbent for gas adsorption. This will help the overall adsorption process by replacing inert hold-down beads with composite adsorbent beads with adsorption capacity for impurities and high mass transfer.

These proposed solutions are especially important in plant retrofits or plant debottlenecking. If one wants to improve the performance of an existing adsorption plant (increase production or increase recovery) one is constrained by the diameter and length of the existing adsorption beds. In many cases the prior art solution of adding smaller particles on the bed exit is not possible because the existing operation parameters of the plant will lead to fluidization of the smaller particles. The current solution (same size or larger particles and/or denser particles) avoids the fluidization and increased pressure drop of the prior art solution.

The examples provided show that the mass transfer performance of the composite beads is enhanced when the core material has significant porosity (10-50%) and pore volume (0.05 to 0.3 cm$^3$/g). Good crush strength of the beads is retained even at these high levels of porosity in the core. The examples also show that improved crush strength of the final composite bead is obtained when the core and shell materials are calcined together. This is contrary to the prior art, where "sintered" cores were taught.

It was found that the mass transfer performance of the inventive beads is more than 2 times greater than well known comparable homogeneous adsorbents of the same particle diameter, as is shown in Table 1, and that the composite adsorbent beads according to the invention can be applied in a wide range of sizes in industrial adsorption columns without being crushed to deliver their surprisingly improved performance. The examples provided also show that the composite beads can be used in both pressure swing and thermal swing processes. The examples also show that the composite beads can be used either as a solitary separation layer or in a layered bed system with the composite beads on the outlet (product) end of the adsorption vessel. In the layered bed approach, the homogeneous adsorbent and the shell of the composite adsorbent on the outlet of the bed preferably are the same adsorbent material.

Another key aspect of the current invention is that adsorbent beads with sufficient mechanical strength can be produced to withstand the rigors of adsorption processing. Hollow adsorbent spheres demonstrate good mass transfer properties during adsorption; however they lack the required mechanical strength to be used in pressure or temperature swing adsorption processes. Crush strength is a standard parameter measured for the specification of adsorbent beads. For the purpose of this application, the specific crush strength is the crush strength according to the ASTM D-4179 method divided by the cross sectional area of the composite adsorbent bead. The crush strength of commercially available 2 mm LiLSX beads from Zeochem (Zeochem™ Z10-05-03) is 11.1 N. The corresponding specific crush strength is 3.5 N/mm$^2$ (see Table 1). Based on this measurement, a minimum desired specific crush strength of a bead for adsorption processing can be considered to be 3 N/mm$^2$.

It was surprising that according to the present invention a composite adsorbent bead can be provided, wherein the shell comprises less than 20% wt/wt of at least one inorganic binder material and still have a specific crush strength of more than 3 N/mm$^2$. Inorganic binders reduce the adsorption capacity of the composite adsorbent bead, so it is desirable to employ as little inorganic binder as possible in the shell material.

In a preferred embodiment, the composite adsorbent bead has a bulk density from 560 to 2000 kg/m$^3$, more preferably 600 to 1500 kg/m$^3$, especially 800 to 1500 kg/m$^3$. The bulk density of a composite adsorbent bead is defined as the weight of adsorbent contained in a given volume consisting of a collection of beads having the same composition and essentially the same diameter. The bulk density is preferably higher than the density of the shell. For the purpose of this document the bulk density is measured according to ASTM D6683.

It is further preferred that the at least one core is substantially spherical and it is particularly preferred that the at least one core has a sphericity in the range of 0.7 to 1. Sphericity of an adsorbent particle is a shape factor, which gives the ratio of the surface area of a sphere, with the same volume as the given adsorbent particle to the surface area of the particle. It was found, that with cores of a low sphericity (less than 0.7) it is difficult to reach a high bulk density.

It is preferred that the at least one core comprises 50 to 100 wt % of agglomerated clay particles, in particular attapulgite, bentonite or kaolin clay. Composite adsorbent beads having a core of these materials show particularly good crush strength and bulk density. The best results could be found for porous cores comprising agglomerated clay particles with a diameter in the range of 0.01 to 5 µm.

In a further preferred embodiment, the at least one core is formed of graphite or a metal, preferably selected from the group consisting of Mg, Fe, Ni, Co, Cu, Zn, Al, Sn, Pb and its alloys.

Preferably, the at least one core has a thermal conductivity in the range of 1 to 450 W/mK.

The at least one adsorbent material is preferably selected from the group consisting of activated alumina, activated carbon and zeolites, preferably ZSM, Chabazite, X, A, or Y type zeolites and even more preferably of low silica X type and those zeolites mentioned in EP-A-1080771 (p. 7, [0043]-p. 9, [0049]).

It is further preferred that the at least one layer of shell material comprises less than 20% wt, more preferably 2 to 20 wt %, of at least one inorganic binder material, preferably selected from the group consisting of silica, clay, aluminium oxide, aluminophosphate, polysiloxane and mixtures thereof. In comparison to homogeneous adsorbent beads, all composite adsorbent beads show a reduced adsorption capacity per unit weight, since the inert core of non-adsorbent material does not have significant adsorption capacity. It is therefore important that the porous and adsorbent shell material comprises only a minimum of an inert and non-adsorbent binder material, such that the composite adsorbent bead still has a sufficiently high crush strength, but has only a limited reduction in adsorption capacity. The specific crush strength should be at least 3 N/mm$^2$ otherwise the composite adsorbent beads might crumble if they are applied in industrial adsorption beds.

It is further preferred that the composite adsorbent beads according to the invention have a diameter of 0.1 to 5 mm, more preferably 0.25 to 4 mm, especially 0.25 to 3 mm. The best results could be achieved with an outer diameter in the range of 0.5 mm to 3 mm.

An improved adsorption performance can be achieved with composite adsorbent beads having a ratio of the core diameter to the composite bead diameter in the range of 0.5 to 0.98, preferably in the range of 0.6 to 0.8.

It is preferred that the core material has an overall porosity in the range of 10-50%, preferably in the range of 20 to 40%. The preferred pore volume of the core material is between 0.02 to 0.3 cm$^3$/g, more preferably in the range of 0.05 to 0.2 cm$^3$/g. The preferred BET surface area of the core material is between 20 and 400 m$^2$/g, more preferably between 40 and 200 m$^2$/g and especially between 40 and 150 m$^2$/g.

It is preferred that the composite adsorbent beads have an overall porosity greater than 40%.

It is further preferred that the interior of the composite adsorbent beads is formed of multiple cores which are all together coated by the outer layer. Typically, a number from 3 up to 100 cores can be incorporated within one adsorbent bead.

Composite adsorbent beads have an advantage over homogeneous adsorbent beads in that they lead to improved volumetric productivity in pressure swing adsorption processes without increase in pressure drop. However pressure drop will increase if the particle size of the adsorbent particles is smaller and/or the particle size distribution ratio $D_{90}/D_{50}$ is higher. It is therefore important to be able to provide a collection of composite adsorbent beads having both a suitable particle size and a low particle size distribution. When classifying a certain collection of particles with sieves, the collection of particles with a high sphericity will lead to a collection with a lower particles size distribution ratio. To reach a high efficiency in the production of a collection of composite adsorbent beads it is therefore important that the sphericity of the composite adsorbent is high.

To overcome the problem of the high particle size distribution ratio, there has been developed a process which leads to a narrow particle size distribution ratio. The process is a spouting bed agglomeration process such as for instance is defined in WIPO patent application publication number WO-A-2004/101132 by Michael Jacob et al. This spouting bed provides agglomerates with a high sphericity and a low value particle size distribution ratio $D_{90}/D_{50}$. However other processes that can produce agglomerates having suitable sphericity and particle size distribution can be used.

Another important feature of the current invention is the formation of the composite bead with a core material that has not been heat treated prior to addition of the shell material. In this way, the shell material (typically a zeolite) and the core material (typically a clay) are fired or calcined together. Typical calcination temperature used in the production of the current composite beads is 200 to 600° C. It is believed that the co-firing process allows for better adhesion of the core and shell materials. The bond formed between the core and shell materials during calcination is an oxygen bond formed by reaction of hydroxide groups present on the core and shell material. The types of reactions expected are as follows: Al—OH+Si—OH+heat=Al—O—Si+$H_2O$. For example, a surface hydroxyl on a zeolite in the form of Al—OH can react with a surface hydroxyl on a core material in the form of Si—OH during calcination to form Al—O—Si+$H_2O$. This may also explain better bonding between the core and shell materials, and hence better crush strength of the composite particles, as the number of hydroxyl groups on the surface of the core material increases. The total number of surface hydroxyls will increase as the surface area, and porosity, of the core increases. Thus, having some porosity in the core and co-firing of green cores and shell material are important aspects for production of useful composite adsorbent beads with required mass transfer and crush strength properties. Calcination or sintering of the core material at high temperature (greater than 600° C.) will allow hydroxyl groups on the surface of the core to react with each other and thereby remove surface sites required to bind with the shell material. It is also important that the core and the shell material are subjected to one and the same heat treatment, such that the core still comprises the organic binder material before the composite bead is subjected to the heat treatment, to obtain sufficiently good crush strength.

It has been found, that composite adsorbent beads prepared from cores having a narrow particle size distribution ratio lead to composite adsorbent beads having also the same or very similar particle size distribution and a high sphericity. The effect is that composite adsorbent beads can be provided having the above-mentioned properties.

The porous and non-adsorbent core preferably comprises agglomerated clay particles with a particle size in the range of 0.01 μm to 5 μm and an organic and/or inorganic binder. The particle size is preferably in the range of 0.05 μm to 2 μm. The clay material is preferably selected from the group consisting of kaolin, attapulgite, and bentonite.

The organic binder material is preferably a water soluble polymer consisting of polyvinylalcohol, modified starch or modified cellulose.

For the purpose of this application, the general definition of clay by sedimentologists is used, which is that clay consists of fine-grained soil particles having a particle size smaller than 4-5 μm. This infers, that the core made with the KM 242 (Keramische Masse) consists of equal or more than 50% wt clay, since its $D_{50}$ is 4 μm.

Because the mean particle size of the non-adsorbent particles in the core should preferably be similar to that of the adsorbent shell, the maximum mean particle size of the non-adsorbent clay particles should also be not more than $D_{50}$=5 μm, to prevent inhomogeneity, that could reduce the crush strength. A mean particle size below 0.01 μm is not desirable, because it does not lead to an improved sphericity and it is difficult to formulate, since it blocks the filters of the agglomeration equipment.

The adsorbent should be formulated following a method known to those skilled in the art of formulating adsorbents. High levels of organic binders, such as polysiloxane, that leave a high inorganic residue should not be applied. The fine residue can block the pores of adsorbents such as zeolites.

It is clear, that composite adsorbent beads, that have a core comprising 100% agglomerated clay particles that have very similar $D_{50}$ and particle size distributions as the surrounding zeolite layer have a similar or greater porosity and permeability than the porous outer adsorbent layer.

The present invention preferably comprises, inter alia, one or any combination of the following aspects:
- the core material has a porosity in the range of 10 to 50%, preferably 20 to 40
- the core material is permeable
- the core material has a pore volume in the range of 0.02 to 0.3 cm$^3$/g, preferably 0.05 to 0.2 cm$^3$/g
- the core material has a BET surface of 20 to 400 m$^2$/g, preferably of 40 to 200 m$^2$/g, especially 40 to 150 m$^2$/g
- the core has a particle size distribution ratio $D_{90}/D_{50}$ of less than 1.6, preferably less than 1.4 and more preferably less than 1.1
- the core material has a thermal conductivity in the range of 1 to 450 W/mK
- the ratio of the core diameter to the ratio of the composite adsorbent bead in the range of 0.5 to 0.98, preferably in the range of 0.6 to 0.8
- the core has a sphericity of 0.7 to 1
- the adsorbent bead has a bulk density in the range of 560 to 2000 kg/m$^3$
- the adsorbent bead has a specific crush strength in the range of 1 to 7 N/mm$^2$
- the adsorbent bead has a diameter of 0.1 to 5 mm, preferably 0.25 to 3 mm
- the adsorbent bead has an overall porosity of greater than 40%
- the adsorbent bead has a sphericity of 0.7 to 1
- the adsorbent bead has a particle size distribution ratio $D_{90}/D_{50}$ of less than 1.6, preferably less than 1.4 and more preferably less than 1.1
- the adsorbent bead has a specific surface in the range of 350 to 800 m$^2$/g, preferably in the range of 600 to 800 m$^2$/g
- the at least one core comprises from 50 to 100 wt % of agglomerated clay particles, preferably selected from the group consisting of kaolin, attapulgite and bentonite and optionally from 0 to 50 wt % of graphite or a metal, preferably selected from the group consisting of Mg, Fe, Ni, Cu, Zn, Al, Sn, Zn, Al, Sn, Pb and its alloys the core formed of particles having a diameter size of 0.01 to 5 μm the at least one adsorbent material is selected from the group consisting of zeolites, preferably ZSM, Chabazite, X, Y, or A type zeolites, even more preferably low silica X the at least one layer comprises 2 to 20 wt % of at least one inorganic binder material, preferably selected from the group consisting of silica, clay, aluminium oxide, aluminophosphate, polysiloxane or mixtures thereof.

It will be appreciated that the invention is not restricted to the details described above with reference to the preferred embodiments but that numerous modifications and variations can be made without departing from the spirit and scope of the invention as defined in the following claims. In particular, although the invention has particular application to the gas purification using PSA and/or TSA techniques, the invention has application to other processes, such as chromatography, in which one or more gases are separated from a mixture for purification, analysis or the like.

The present invention will now be described in detail with reference to the following figures and examples, which by no means shall limit the scope of the invention.

FIG. 1 shows a plot of nitrogen diffusivity of various adsorbents as a function of total porosity in the core material in the composite bead.

FIG. 2 shows a plot of particle crush strength as a function of porosity in the core material.

FIG. 3 shows a plot of nitrogen pore volume in the core versus nitrogen diffusivity.

FIG. 4 shows a plot of the oxygen production rate versus the feed velocity in a layered bed.

FIG. 5 shows a plot of the oxygen production versus the oxygen recovery.

EXAMPLE 1

Clay powder obtained from Fa. Goerg and Schneider type Masse Nr. 242 having a particle size range from 3 μm and 7 μm was pelletized in a Glatt Rotor coater type SR unit. The clay powder was fluidized in the rotor coater and polyvinyl alcohol (Mowiol™ 4/88; Ter Hell & Co. GmbH) solution having a solid content of 20% wt. was sprayed into the fluidized bed in an amount of 4.3 g polyvinyl alcohol/100 g clay powder. After reaching a certain humidity level, the acceleration forces that occur in this process result in the formation of agglomerates, which are then rounded out into uniform and dense pellets that were dried in the fluid bed.

The resultant dry clay cores were classified in a second step with a sieve to reduce the standard deviation of the mean diameter of the pellets from +/−22% to +/−10%. Mean diameters of, e.g., 2500 μm, 1400 μm, 350 μm, 200 μm and 150 μm are producible.

Subsequently, the core fraction needed was loaded into a Glatt SR rotor coater and sprayed with a zeolite suspension comprising 2 wt % inorganic binder (Evonik Aerosil 380) and 6.5% PVA (Mowiol™ 4/88) per kg of zeolite and 2 wt % of glycerine per kg zeolite. The coating was continued until the target average adsorbent particle size was reached. The zeolite powder type 5A was obtained from UOP and the zeolite powder type LiLSX was obtained from Chemie Werk Bad Kostriz.

The dimensions of the cores of the various batches were as indicated in Table 1 below.

Subsequently, the composite beads were subjected to a heat treatment in line with the following procedure:

Placing 9 mL of beads into a stainless steel tube which has an 8 mm inner diameter Placing the tube in a furnace and passing a 390 mL per minute flow of air containing less than 50 ppmV of $CO_2$ and less than 10 ppmV $H_2O$ through the tube.

Increasing the temperature inside the furnace from ambient temperature to 500° C. at a rate of 1° C./min and holding for 4 hours at 500° C.

The samples reference numbers 317-13 and 317-20 were produced in this way. In the case of sample reference number 321-20, prior to the heat treatment described above, the sample was dried in an oven blanketed by a dry air stream containing less than 50 ppmV of $CO_2$ and less than 10 ppmV $H_2O$. This drying was conducted by heating to a series of temperatures (50, 90, 110, 130, 150, 170, 190, 210, and 230° C.) and holding at each temperature for at least 45 minutes. The sample was not exposed to ambient air before undergoing the heat treatment.

The crush strength was measured according to ASTM method ASTM D4179 while the bulk density was determined according to ASTM D6683. Crush strengths were measured on products after final heat treatment. The results of testing of the composite beads and corresponding homogeneous beads is shown in Table 1.

Table 1 includes $N_2$ capacity of each adsorbent as well as the $N_2$ mass transfer coefficient. The $N_2$ capacity at 40° C. and 101 kPa $N_2$ was determined by weight uptake in a thermogravimetric analyzer. The mass transfer properties of the adsorbents were evaluated using a standard volumetric adsorption apparatus. The experiment consisted of exposing an adsorbent sample, which is initially at vacuum and 30° C. to a measured amount of $N_2$ at 760 Torr (101 kPa). The change in pressure was then followed as a function of time. A similar pressure history using the same weight of quartz beads in place of the adsorbent sample is subtracted from the pressure-time data to obtain a plot of the amount of $N_2$ adsorbed as a function of time. From the initial slope of the uptake curve, a $N_2$ diffusion parameter in units of inverse time ($sec^{-1}$) can be obtained.

The theory behind the derivation of the diffusion parameter is given in Chapter 6, section 6.2 of Ruthven (Ruthven, D. M., Principles of Adsorption and Adsorption Processes, John Wiley & Sons, New York (1984)).

The results in Table 1 show that the specific crush strength of all composite bead samples was more than 3 $N/mm^2$. In addition, the composite adsorbent beads according to the invention have a considerably improved mass transfer performance over homogeneous beads of the same diameter. In the case of 5A materials, a 2.1 mm composite bead had a nitrogen mass transfer coefficient 6 times greater (1.28/0.50) than a 2.0 mm homogeneous bead (Grace Davison grade 522). A 2 mm composite bead with a shell of LiLSX showed a nitrogen mass transfer coefficient 2.6 times greater than a 2 mm homogeneous LiLSX (Sample 305-22, Zeochem™ Z10-05-03).

The results in Table 1 also show that small particles with porous cores can be produced as well. Sample 317-20, a 0.5 mm composite bead with 5A shell, showed a nitrogen mass transfer coefficient of 2.03 $sec^{-1}$. In all cases, the density of the composite bead samples produced in accordance with the invention have bulk densities higher than their corresponding homogeneous adsorbent. For the 2 mm 5A samples, the density enhancement is about 14%, while for LiLSX, the density enhancement is about 24%.

TABLE 1

| Sample | 317-13 | 321-20 | 317-20 | Grace 522, homogeneous 5A | 305-22 Zeochem™ Z10-05-03, homogeneous LiLSX |
|---|---|---|---|---|---|
| Core diameter (mm) | 1.4 | 1.4 | 0.3 | N/A | N/A |
| Bead diameter (mm) | 2.1 | 2.0 | 0.5 | 2.0 | 2.0 |
| Diameter ratio | 0.67 | 0.70 | 0.60 | N/A | N/A |
| $N_2$ Mass transfer coefficient ($sec^{-1}$) | 1.28 | 0.76 | 2.03 | 0.50 | 0.29 |
| Adsorption capacity (101 kPa $N_2$ at 40° C.) | 0.18 mmole/g | 0.28 mmole/g | 0.21 mmole/g | 0.48 mmole/g | 0.84 mmole/g |
| Core material | Porous clay | Porous clay | Porous clay | N/A | N/A |
| Zeolite Shell material | 5A | LiLSX | 5A | N/A | N/A |
| Bulk density of composite beads (kg/m$^3$) | 807 | 755 | 622 | 711 | 610 |
| Specific crush Strength (N/mm$^2$) | 4.0 | 4.4 | 3.6 | 5.7 | 3.5 |

EXAMPLE 2

Kaolin Powder (Omya Kaolin Nr. 86) having a mean particle size of 0.35 μm was suspended in water at room temperature and mixed with an ultra thorax mixer into a suspension of 38 wt %. 5 g polyvinyl alcohol (Mowiol™ 4/88)/100 g kaolin powder was added and 10 g glycerin/100 g kaolin powder.

This suspension was sprayed into a spouting bed unit, type GF3, to produce dry kaolin cores with a mean diameter of 1000 μm. The inlet air temperature was held at between 100 to 140° C. and the outlet air temperature between 30° C. and 60° C.

The cores had a moisture content of 0.5 wt %. Subsequently, the cores were loaded into a Glatt SR rotor coater and were sprayed with a zeolite suspension comprising 2 wt % inorganic binder (silica powder Aerosil™) and 6.5% PVA (Mowiol™ 4/88) per kg of zeolite and 2 wt % of glycerine per kg zeolite. The zeolites were standard zeolite powders obtained from Chemie Werk Bad Köstriz.

The mean particle size $D_{50}$ and $D_{90}$ of the clay cores was determined with a Retsch Camsizer™. The mean particles size $D_{50}$ was 1005 μm; $D_{10}$ was 867 μm and $D_{90}$ was 1244 μm. The sphericity was determined to be 0.9. A lower value of the sphericity can lead to an inferior crush strength, since it leads to a shell with a variation in the layer thickness. Cores with a particles size distribution ratio ≤1.6 and a sphericity of greater than 0.7 can be produced with the spouting bed process without any significant sieving. Improved particle size distribution and sphericity can be obtained by continuously recycling the oversized and undersized fractions. The oversized fraction can be crushed and recycled into the process continuously. Due to the high wear on the agglomerates the sphericity is improved at the same time.

All cores of the exemplified composite adsorbent according to the invention comprise in the range of 50%-100% wt of agglomerated clay particles having a diameter of between 0.01-5 μm. This also leads to a sphericity greater than 0.7. Cores with a sphericity greater than 0.7 can also be made by starting the agglomeration with clay particles having a particle size greater than 5 μm and coating these with an amount of 50% wt of very fine clay particles to obtain a sphericity greater than 0.7.

Good composite adsorbent beads according to the invention can be prepared, by using more than 90% of a clay having a mean particle size which is equal or smaller than the mean particle size of the adsorbent. Particles with a diameter greater than 5 μm should preferably be absent, since they can lead to lower sphericity.

Composite adsorbent beads with good crush strength sphericity and particle size distribution were also made by applying clay with a mean particle size $D_{50}$ of 4 μm (KM242) and LiLSX Zeolite powder having a $D_{50}$ of 4.5 μm or 5A zeolite powder with a $D_{50}$ of 3.1 μm. Adsorbent powder having a mean particle size greater than 5 μm is highly undesirable, since it leads to lower mass transfer through the longer micropores. Therefore the mean particle size of the adsorbent should preferably not be greater than 5 μm.

EXAMPLE 3

This example shows the importance of sphericity and clay particle size of the core material on the crush strength of the composite adsorbent produced as described in Example 1 (Table 2).

TABLE 2

| Core material | Ceramic Mixture | Kaolin Clay |
|---|---|---|
| Core Material name | KM 242 | Burgess 86 |
| Particle size range of core material | 3-7 μm | |
| Mean particle size of core material | 4 μm | 0.35 μm |
| $D_{50}$ of core | 1.44 mm | 1.39 mm |
| Sphericity of core | 0.910 | 0.938 |
| Crush strength of 2 mm composite adsorbent (5A Zeolite) | 2.7 N | 4.4 N |

Both composite adsorbent beads showed improved volumetric productivity over state of the art homogeneous products of the same size and same adsorbent material. The sphericity of the composite adsorbent beads was further improved during the application of the adsorbent during the layering process.

EXAMPLE 4

To test the hypothesis that formation of a bond between the core and shell materials during calcination improves crush strength, the crush strength of composite beads of 0.48 mm diameter with a core diameter of 0.3 mm was prepared as previously described in Example 1. The clay used in both cases was kaolin and the inorganic binder was 2 wt % Evonik Aerosil™ 380. In one case, the clay core was heat treated to 900° C. prior to composite bead formation, while in the other case; the core and shell were co-fired at 500° C. The crush strength of both final beads was measured. The measured crush strength of the beads formed with the sintered core (prior heated to 900° C.) was 0.8 N/mm$^2$, while that value for the composite bead that was co-fired was 3.6 N/mm$^2$. The composite bead that was co-fired had a crush strength substantially higher than the bead produced with a sintered core. This example shows the importance of co-firing to produce an improved crush strength bead.

EXAMPLE 5

The present example shows that high density composite beads can be formed with the current production technique. In addition, low amounts of inorganic binder can be employed in the shell material and keep adequate crush strength. This lower binder content in the shell improves the overall capacity of the composite beads.

Cores of quartz sand coated in the same Glatt SR rotor coater having an outer layer of zeolite and inorganic binder in a ratio 80/20% wt were compared with samples of composite adsorbent beads according to the invention. Composite beads made with the porous clay core were produced having an outer layer of zeolite to inorganic binder of 98/2%. In both cases the inorganic binder used in the outer shell was attapulgite clay. The coating and, heat treatment procedure used are those described in Example 1.

Table 3 shows a comparison of properties of homogeneous beads, composite beads with a solid, non-porous core (sand) and with a porous core (clay) with essentially the same particle diameter. The results show that the composite bead produced using the porous clay core has a higher crush strength than the homogeneous bead or the bead produced with a non-porous sand core.

This surprising effect may be explained in part by the fact, that the non-porous quartz sand core has a lower sphericity and the outer adsorbent layer consequently has only a very low density between the edges of the core. Sphericity of an adsorbent particle is a shape factor, which gives the ratio of the surface area of a sphere with the same volume as the given adsorbent particle to the surface area of the particle. The sphericity of the quartz sand core was lower than the sphericity of the porous clay core which had a sphericity of more than 0.8. It has been found that solid non-porous cores having a sphericity less than 0.7 have lower crush strength than those with a sphericity greater than 0.7.

TABLE 3

| Sample | Homogeneous (Grace 522) | Impermeable Quartz Sand Core | Porous Clay Core |
|---|---|---|---|
| Inorganic Binder Content in adsorbent or shell | 17% wt | 20% wt | 2% wt |
| Particle diameter/ core diameter | n.a. | 0.68 | 0.68 |

TABLE 3-continued

| Sample | Homogeneous (Grace 522) | Impermeable Quartz Sand Core | Porous Clay Core |
|---|---|---|---|
| Average Bead diameter (mm) | 2.0 | 2.1 | 2.1 |
| Bulk Density of beads (kg/m$^3$) | 711 | 976 | 807 |
| Specific crush strength (N/mm$^2$) | 5.7 | 7.4 | 8.1 |
| Nitrogen pore volume of core (cm$^3$/g) | N/A | 0.006 | 0.118 |

EXAMPLE 6

FIG. 1 shows a plot of nitrogen diffusivity determined for various adsorbents as a function of total porosity in the core material in the composite bead. All composite beads were produced as described in Example 1. The nitrogen diffusivity in units of cm$^2$/sec was determined by multiplying the nitrogen mass transfer coefficient in units of sec$^{-1}$ (determined as described in Example 1) by the thickness of the adsorbent shell squared (sec$^{-1}$×(cm)$^2$). The nitrogen diffusivity is a measure of the nitrogen mass transfer rate. Larger nitrogen diffusivity corresponds to a faster mass transfer rate and the better adsorbent performance in adsorption processing. The nitrogen diffusivity was used as a performance parameter versus the nitrogen mass transfer coefficient since beads of slightly different shell thickness were studied and the value of nitrogen diffusivity compensates for that difference. The total porosity was determined as previously noted. The nitrogen pore volume (and BET surface area) was determined by nitrogen adsorption at 77 K at a relative pressure of 0.98. The total pore volume was calculated using Gurvich's rule. The unit employed was an ASAP 2010 from Micromeritics. The crystal density of the cores was determined by water pycnometry (ASTM D 854-00). The crystal density of the porous clay cores varied from 2.48 to 2.64 g/cm$^3$, while the sand cores showed crystal densities of 2.22 g/cm$^3$.

The core materials tested were extracted from finished composite beads. The cores were obtained by rolling the composite bead material between two aluminum plates until the shell was fractured from the core. The cores at this point contained some shell material. The core was then washed 3-4 times with deionized water to free the core of any remaining shell material. The cores were then dried at 100° C. prior to air activation to 400° C. Nitrogen BET surface area and pore volume were obtained on the core materials at 77 K on the air activated materials.

The results of FIG. 1 show that as the porosity in the core increases, the nitrogen diffusivity increases. The prior art teaches the use of non-porous cores, but the results of FIG. 1 clearly show that porous cores show higher mass transfer properties than non-porous cores. The bead with 100% porosity is a hollow core material that shows excellent adsorption mass transfer characteristics. Unfortunately, as shown in FIG. 2, the crush strength of the hollow core material is too low to be of use in industrial application. The two composite beads produced according to the prior art (non-porous sand cores with total porosity from 1.3 to 1.9%) show low mass transfer performance. The three porous clay cores with porosities ranging from 17 to 33% show nitrogen diffusivities at least 2 times greater than corresponding non-porous core materials.

FIG. 2 shows a plot of particle crush strength as a function of porosity in the core material. The results show that with core porosity from 1.3 to 33%, the specific crush strength of the composite beads is sufficient for industrial application (3 N/mm$^2$). In addition, beads with a core porosity of over 30% have essentially the same crush strength as beads with a core porosity of 1.3%. It is surprising that a bead with such a high porosity should have such a high crush strength. Based on both a polynomial and linear fit of the data, cores of porosity of almost 90% could be used before the crush strength reaches unacceptable levels.

The results in FIG. 1 can also be presented in table form. Table 4 shows the porosity, nitrogen pore volume and BET surface area of various core materials and the corresponding nitrogen diffusivity and crush strength of the composite beads formed using that core. The hollow core material, despite its good mass transfer performance, has inadequate mechanical strength to be used in cyclic adsorption processes. The other point of note is that despite the significant porosity in the porous core samples, the crush strength remains at a high level. Thus, the porous core leads to improved mass transfer properties, improved bulk density and sufficient crush strength for adsorption processing.

FIG. 3 shows a plot of nitrogen pore volume in the core versus nitrogen diffusivity. The plot clearly shows that cores with larger nitrogen pore volume yield composite beads with improved mass transfer properties.

TABLE 4

| Core | Core Porosity | Nitrogen diffusivity of composite bead (cm$^2$/sec) | Nitrogen pore volume of core (cm$^3$/g) | BET surface area of core (m$^2$/g) | Specific Crush strength of composite bead (N/mm$^2$) |
|---|---|---|---|---|---|
| Hollow | N/A | 2.48 × 10$^{-3}$ | N/A | N/A | 1.3 |
| Sand | 1.3% | 2.35 × 10$^{-4}$ | 0.006 | 6.5 | 7.5 |
| Sand | 1.9% | 2.77 × 10$^{-4}$ | 0.008 | 17 | 8.2 |
| Clay | 17% | 6.75 × 10$^{-4}$ | 0.083 | 27 | 6.6 |
| Clay | 24% | 7.40 × 10$^{-4}$ | 0.119 | 47 | 7.3 |
| Clay | 33% | 8.40 × 10$^{-4}$ | 0.184 | 96 | 8.9 |

EXAMPLE 7

The total porosity of cores, shells and composite particles was measured by nitrogen pore volume and water pycnometry as described previously. Table 5 shows the total porosity in the composite bead, the core and the shell of two materials made as per Example 1, but with two different core materials. Both shell materials are 5A zeolite, the particle diameters were 2.1 mm and the ratio of particle diameter to core diameter was 0.68. The core and shell material were separated as indicated in Example 6.

TABLE 5

| Core | Total porosity in composite bead | Total porosity in core | Total porosity in shell |
|---|---|---|---|
| Sand | 38% | 1.3% | 54% |
| Clay | 46% | 33% | 52% |

The results of the example show that in the case of the porous clay core, the porosity of the core is 63% (33%/52%) of that of the shell material. This clearly shows that the core is highly porous. In the case of the sand core, the porosity of the core is only 2.4% (1.3%/54%) of that of the shell material.

EXAMPLE 8

A key aspect of the current invention is that the core material in the composite bead is porous and non-adsorbing. Example 6 clearly shows that porosity in the core material results in improved mass transfer adsorbents versus non-porous cores. However, it is desired that the core material adsorb as little gas as possible. This is because the more adsorption that takes place in the core material, the longer the diffusion path length and the slower the mass transfer. The porosity in the core helps with improving crush strength and density of the composite bead as already shown, but may also improve mass transfer by creating an additional driving force for bulk diffusion into the porous core.

To test the adsorption capacity of the core and shell materials, nitrogen adsorption isotherms were measured at 30° C. and 101 kPa pressure in a standard volumetric adsorption apparatus (Micromeritics ASAP 2010). Prior to the adsorption measurements, the samples were activated in vacuum at 400° C. Table 6 gives the nitrogen capacities of a porous clay core from sample 317-13 in Table 1, a homogeneous 5A (Grace grade 522) and a homogeneous LiLSX (Zeochem Z10-03-05).

TABLE 6

| Sample | Nitrogen capacity at 30° C., 101 kPa (mmole/g) |
|---|---|
| Porous clay core | 0.0015 |
| Grace 522 | 0.54 |
| Zeochem Z10-03-05 | 0.93 |

The results in Table 6 clearly show that even though the clay core is porous (nitrogen pore volume of 0.119 cm$^3$/g), the nitrogen adsorption capacity is over 300 times less than that of homogeneous 5A or LiLSX. This result shows that while the porous core does provide porosity, it does not partake in the adsorption process to an appreciable extent.

EXAMPLE 6

Hydrogen PSA pilot unit testing has been done to compare the performance of 5A zeolite composite adsorbent beads according to the invention prepared according to the method defined in Example 1 (0.5 mm with 0.3 mm core) and a homogeneous 5A zeolite adsorbent bead (0.35 mm) obtained from Shanghai Hengye Corporation. A cycle of 4/1/1 (4 bed system with 1 bed on feed and 1 equalization; U.S. Pat. No. 3,430,418) was used to treat a 135 psig (10.3 bar absolute) feed gas consisting of 73% $H_2$, 18% $CO_2$, 5% $CH_4$, 3% CO and 1% $N_2$. Each bed had an inside diameter of 0.87 inches (2.2 cm), a length of 5 feet (150 cm) and was packed with 50 vol % 5A at the product end of the bed and 50 volt 0.75 mm carbon (Kureha BAC). The $H_2$ product purity was controlled at 1 ppm CO. The two 5A samples were compared in terms of $H_2$ recovery ($H_2$ produced per cycle/$H_2$ in feed stream per cycle) and bed size factor (BSF). The BSF units are cubic meters of total adsorbent required to produce 1000 Nm$^3$/h of $H_2$. Clearly, an adsorbent that yields higher $H_2$ recovery (higher efficiency) and a smaller bed size factor (smaller bed to produce a given volume of $H_2$) is preferred. Results of the testing show that at a 10 second feed (adsorb) time, the homogenous adsorbent showed a $H_2$ recovery of 68.9% and a BSF of 0.80. The corresponding results with the 5A composite adsorbent bead according to the invention show a $H_2$ recovery of 70.9% and a BSF of 0.74. These results show that the porous composite adsorbent bead according to the invention exhibits higher recovery and lower BSF than the homogenous adsorbent.

This result was obtained even with a composite bead larger in diameter than the corresponding homogeneous bead. The large diameter beads lead to lower pressure drop and improved process performance. This example shows that the composite adsorbent beads from the current invention can outperform homogeneous adsorbents in pressure swing adsorption application where the composite adsorbent beads replace all the homogeneous adsorbent beads in the adsorption vessel.

EXAMPLE 10

Example 9 shows the utility of the composite adsorbent bead according to the invention in PSA application. The importance of mass transfer performance in PSA applications is well documented (e.g. U.S. Pat. No. 4,964,888). U.S. Pat. No. 4,964,888 shows that the high mass transfer adsorbent needs to be placed only at the product end of the bed where the impurity mass transfer zone is located. U.S. Pat. No. 4,964,888 solves the problem of improving mass transfer rate in the mass transfer zone by using smaller adsorbent particles. The issue with using small particles is 1) they increase the pressure drop in the system which is undesirable and 2) they can fluidize under the operational flow velocities in the PSA process. The composite adsorbent bead according to the invention eliminates these issues because the particle size is larger and the bulk density is higher than the materials proposed in U.S. Pat. No. 4,964,888. However, mass transfer is also important in TSA (temperature swing adsorption) processes as well, especially TSA systems where large adsorbent particles (2 mm and greater) are used since the percentage of the bed which contains the mass transfer zone is greater the larger the adsorbent particles.

To test the utility of the composite adsorbent bead according to the invention in TSA application $N_2$ breakthrough curves in helium carrier gas were measured. Prior to all experiments, the beds were regenerated in flowing He at 150° C. for 8 hours at a flow rate of 10 standard liters/min. In these tests, a 0.87 inch (2.21 cm) diameter and 6 foot (189 cm) long column was used. The feed gas was 500 ppm $N_2$ in He with the following feed conditions: 350 psig (25 MPa absolute), 25° C. and a flow rate of 4718 $Nm^3/m^2$ cross sectional area/hour. The adsorbents tested included a homogenous 5A bead (Grace grade 522, 2.0 mm diameter, 711 $kg/m^3$), a 5A composite bead according to the invention (sample 317-13, 2.1 mm diameter, 1042 $kg/m^3$) and a bed with homogeneous 5A beads on the feed end of the bed (77%, 140.8 cm) and composite 5A adsorbent beads on the product end of the bed (23%, 42.1 cm). The results of the breakthrough testing are shown in the following Table 7.

time to 1 ppm breakthrough and $t_m$ is the time to 250 ppm breakthrough. The dynamic capacity is calculated by the time to initial $N_2$ breakthrough (1 ppm). The results in the table show that the homogeneous 5A bead has a greater equilibrium and dynamic capacity than the composite 5A bead, but the composite 5A bead has a shorter LUB (which is one half of the mass transfer zone length). When a split bed of homogenous 5A beads and composite 5A beads are used, the dynamic capacity is the greatest. This means a split bed of homogeneous 5A beads (for high equilibrium capacity) and 5A composite adsorbent beads according to the invention (for shorter mass transfer zone length) can increase the dynamic capacity of a TSA system. The dynamic capacity of a TSA system is important since the on-stream time of the beds is limited by initial impurity breakthrough. So a split bed of homogenous 5A beads and composite 5A beads can treat 3.5% (0.0090 mmole/$cm^3$/0.0087 mmole/$cm^3$) more feed gas prior to 1 ppm nitrogen breakthrough. This example shows the utility of the composite bead of the current invention in a thermal swing adsorption process and in a layered bed configuration.

EXAMPLE 11

The following example shows that the composite beads of the current invention have application in a PVSA (Pressure-Vacuum Swing Adsorption) process wherein the composite adsorbent beads are placed on the outlet of the bed. A single bed PVSA (Pressure-Vacuum Swing Adsorption) system with an inner bed diameter of 66.55 mm was filled with two layers of adsorbent. Starting at the feed end, a 129 mm layer of Alcan Alumina AA300, 8×14 mesh was loaded. The packed bed density of the Alcan alumina was 846.1 grams/liter. Next, a 301 mm layer of Köstrolith™ LiLSX from CWK (Chemiewerk Bad Köstritz), 1.6 to 2.5 mm diameter beads (hereafter homogeneous LiLSX) was loaded. The mass-weighted mean particle size for the homogeneous LiLSX was 1.86 mm and the packed bed density was 660.9 grams/liter.

The system runs a basic cycle which consists of 3 steps: feed (including repressurization with feed), evacuation, and purge (with gas from the product tank). The evacuation time was 8.0 seconds and the purge time was 4.0 seconds. A series of experiments at different feed rates were run. The feed rate was set by adjusting a bypass valve between the compressor and the adsorber bed. As the bypass valve was closed, the feed air flow rate increased. The feed end of the adsorbent bed operates over the pressure range 40 to 140 kPa. The 140 kPa

TABLE 7

| Adsorbent | Equilibrium capacity (mmole/$cm^3$ of bed) | Length of unused Bed (cm) | Time to 1 ppm $N_2$ breakthrough (sec) | Time to 250 ppm $N_2$ breakthrough (sec) | Dynamic capacity (mmole/$cm^3$ of bed) |
|---|---|---|---|---|---|
| Grace 522 | 0.0133 | 63.5 | 576 | 882 | 0.0087 |
| Composite 5A bead | 0.0059 | 40.8 | 300 | 386 | 0.0046 |
| 77% Grace 522/23% Composite 5A bead | 0.0116 | 41.5 | 606 | 784 | 0.0090 |

The equilibrium capacity is calculated by the time to the midpoint of $N_2$ breakthrough (flow rate×mole fraction of nitrogen in gas×time to midpoint/volume of bed) and the length of unused bed (LUB) is calculated by the expression LUB=L[1−($t_i/t_m$)], where L is the length of the bed, $t_i$ is the level was maintained at different feed flow rates by adjusting the feed time. For the homogeneous LiLSX, the feed time was 11.4 seconds. If needed, a vacuum bypass valve was used to maintain the minimum pressure of 40.7 kPa. Product flow rate was adjusted to maintain product purity at 90+/−0.5%

The system was run at 3 different linear velocities from 179.8 to 240.8 mm/second. The linear velocity is calculated as the actual volumetric flow rate into the feed end of the column divided by the cross sectional area of the empty column and it is a simple average over the course of the feed step. The resulting values for product flow rate at standard conditions of 21° C. and 101 kPa and oxygen recovery in the product are shown in Table 8 and FIGS. 4 and 5. The pressure drop across the entire height of the packed adsorbent bed was measured by a bi-directional differential pressure transducer. During the evacuation step, the average pressure drop across the adsorbent bed was 12.24 inches of water (3.05 kPa). The performance of the homogeneous LiLSX represents the current art.

The same PVSA system as described above was used for testing a layer of composite LiLSX beads as per the current invention on the outlet of the bed. The adsorbent bed was loaded with three layers of adsorbent. Starting at the feed end, a 129 mm layer of Alcan Alumina AA300, 8×14 mesh was loaded. The packed bed density of the Alcan alumina was 861.2 grams/liter. Next, a 150 mm layer of homogeneous LiLSX was loaded. The packed bed density of the homogeneous LiLSX layer was 666.8 grams/liter. Finally, a 150 mm layer of inert core LiLSX beads (sample 321-22) with an average core diameter of 1.4 mm and an average overall diameter of 2.0 mm was loaded. The packed bed density of the inert core LiLSX layer was 808.9 grams/liter.

Sample 321-22 was produced in the same way as sample 321-20 except for heat treatment. Heat treatment was conducted in a larger stainless steel tube (41.3 mm internal diameter) loaded with 350 mL batches, through which a flow rate of 17 liters per minute of air containing less than 50 ppmV of $CO_2$ and less than 10 ppmV $H_2O$ was passed. The tube was placed in a furnace and heated from ambient at a rate of 1° C./min to 250° C. and held at 250° C. for 5 hours. Heating was then resumed at a rate of 1° C./min to 500° C. and held at 500° C. for 5 hours. The furnace was then turned off and the sample allowed to cool, while the 17 liter per minute air flow was maintained.

The evacuation time was 8.0 seconds and the purge time was 4.0 seconds. The feed end of the adsorbent bed operates over the pressure range 40 to 140 kPa. The 140 kPa level was maintained at different feed flow rates by adjusting the feed time. For this layered main adsorbent combination, the feed time was 9.2 seconds. Product flow rate was adjusted to maintain product purity at 90+/−0.5%

The system was run at 4 different linear velocities from 210.3 to 448.1 mm/second, calculated as above. As before, the results are shown in Table 8 and FIGS. 3 and 4. In both production rate and oxygen recovery, the layering of homogeneous LiLSX followed by inert core LiLSX beads on the vessel outlet is far superior to a bed loading of only homogeneous LiLSX. At a feed velocity of about 210 mm/sec, the layered bed shows an oxygen recovery of about 50% while that for the single layer of homogeneous LiLSX is only about 29%. This large difference in oxygen recovery significantly reduces the power required to produce a given volume of oxygen. In addition, the layered bed approach increases the oxygen productivity as shown in FIG. 4. At an oxygen recovery of about 32%, the homogeneous LiLSX bed can produce about 1.2 standard liters of oxygen per minute, while the layered bed can produce over 1.8 standard liters of oxygen/min. This result shows that for a given bed size, the layered adsorbent approach can produce more oxygen. Thus, the layered bed approach in oxygen PVSA can improve both oxygen recovery (lower operating costs) and improve oxygen production/unit volume of bed and thereby lower capital costs.

This improvement in oxygen PVSA performance for the layered bed occurred even though the solid core LiLSX was a larger bead diameter than the homogeneous LiLSX. During the evacuation step, the average pressure drop across the adsorbent bed in the layered approach was 10.61 inches of water (2.64 kPa). The corresponding pressure drop for the smaller diameter homogeneous LiLSX was 12.24 inches of water (3.05 kPa). The lower pressure drop allowed by the larger inert core beads will result in additional power savings versus the homogeneous LiLSX beads.

TABLE 8

| Main Adsorbent Vessel Loading | Feed Velocity (mm/s) | Product flow rate (std liters/min) | Product recovery (% oxygen) |
|---|---|---|---|
| 100% Homogeneous LiLSX | 179.8 | 1.15 | 32.5% |
|  | 207.3 | 1.12 | 29.0% |
|  | 240.8 | 1.08 | 25.8% |
| 50 vol % Homogeneous LiLSX followed by 50 vol % solid core composite LiLSX | 210.3 | 1.73 | 50.2% |
|  | 277.4 | 1.82 | 44.1% |
|  | 362.7 | 1.78 | 37.4% |
|  | 448.1 | 1.82 | 34.5% |

The invention claimed is:

1. A composite adsorbent bead for the separation of at least one gas component from a gas mixture, the adsorbent bead having at least one porous and non-adsorbent core comprising at least one inorganic material and a porous and adsorbent shell comprising at least one layer comprising a porous adsorbent material on the surface of the core, wherein the inorganic material is in the form of particles having a diameter in the range of 0.01 to 5 μm.

2. The composite adsorbent bead of claim 1, wherein the core material has a porosity in the range of 10 to 50% and/or a pore volume in the range of 0.02 to 0.3 cm$^3$/g.

3. The composite adsorbent bead of claim 1, wherein the core comprises agglomerated inorganic particles having a mean particle size equal to or smaller than the mean particle size of surrounding agglomerated adsorbent particles forming said layer.

4. The composite adsorbent bead of claim 1, wherein the core has a particle size distribution ratio $D_{90}/D_{50}$ of less than 1.6 and a sphericity of 0.7 to 1.

5. The composite adsorbent bead of claim 1, wherein the core meets one or any combination of the following specifications:
    a thermal conductivity in the range of 1 to 450 W/mK
    a sphericity of 0.7 to 1
    a BET surface of 20 to 400 m$^2$/g
    a particle size distribution ratio $D_{90}/D_{50}$ of less than 1.6
    a porosity in the range of 10 to 50%
    is permeable and/or
    a pore volume in the range of 0.02 to 0.3 cm$^3$/g.

6. The composite adsorbent bead of claim 1, wherein the composite adsorbent bead meets one or any combination of the following specifications:
    a bulk density in the range of 560 to 2000 kg/m$^3$
    a specific crush strength in the range of 1 to 7 N/mm$^2$
    a diameter of 0.1 to 5 mm
    a ratio of the core diameter to the diameter of the composite adsorbent bead in the range of 0.5 to 0.98
    an overall porosity greater than 40%
    a sphericity of 0.7 to 1 a particle size distribution ratio $D_{90}/D_{50}$ of less than 1.6 a specific surface in the range of 350 to 800 $m^2g^{-1}$ and/or less than 20% wt of at least one inorganic binder material in the adsorbent layer.

7. The composite adsorbent bead of claim 1, wherein the at least one core comprises
from 50 to 100 wt % of agglomerated clay particles and
from 0 to 50 wt % of graphite or a metal.

8. The composite adsorbent bead of claim 1, wherein the at least one adsorbent material is selected from the group consisting of zeolites.

9. The composite adsorbent bead of claim 1, wherein the at least one layer comprises 2 to 20 wt % of at least one inorganic binder material.

10. The composite adsorbent bead of claim 1, wherein the core and shell materials have been calcined together.

11. A process for the production of a composite adsorbent bead according to claim 1, comprising:
   a) producing a dried porous non-adsorbent core having a moisture content in the range of 0.1 wt % and 25 wt %, comprising an organic binder,
   b) applying a layer comprising adsorbent material, and
   c) at least one heating step, whereby the organic binder material is removed.

12. A process of producing composite adsorbent beads comprising forming a non-sintered core comprising an inorganic material having hydroxyl groups and an organic binder; coating the core with a layer comprising an adsorbent material having hydroxyl groups, an organic binder and 2 to 20 wt % inorganic binder; and heating the coated core to remove the organic binder and calcining the core and layer together.

13. The process of claim 12, wherein the inorganic core material is clay, the adsorbent material is selected from the group consisting of zeolites, and the inorganic binder is selected from the group consisting of silica and clay.

14. A dried porous and non-adsorbent core, suitable as an intermediate product for the production of a composite adsorbent bead comprising agglomerated clay particles, wherein the clay particles have a particle size in the range of 0.05 μm to 5 μm and an organic binder.

15. A gas separation process for the separation of at least one gas component from a gas mixture comprising feeding a gas mixture comprising at least two gas components into an adsorption vessel comprising a bed of the composite adsorbent beads of claim 1 and subjecting the gas mixture to conditions which allow the adsorption of at least one gas component which has to be separated from the gas mixture.

16. A process of conducting an adsorption process comprising contacting a gas mixture to be separated with the adsorbent bead according to claim 1 wherein the adsorbent bead is provided as layered adsorption beds.

17. An adsorption vessel having an adsorption bed comprising composite adsorbent beads according to claim 1.

18. The adsorption vessel of claim 17, wherein the adsorption bed comprises the composite adsorbent beads on the outlet end of the adsorption vessel and/or homogeneous adsorbent bead at the inlet end of the vessel.

19. The composite adsorbent bead of claim 2, wherein the core has a particle size distribution ratio $D_{90}/D_{50}$ of less than 1.6 and a sphericity of 0.7 to 1.

20. The composite adsorbent bead of claim 3, wherein the core has a particle size distribution ratio $D_{90}/D_{50}$ of less than 1.6 and a sphericity of 0.7 to 1.

\* \* \* \* \*